Dec. 21, 1943.    S. F. LLOYD    2,337,117
FOOD PREPARING AND VENDING MACHINE
Filed July 21, 1942    8 Sheets-Sheet 1

INVENTOR.
Samuel F. Lloyd
BY
ATTORNEY.

Dec. 21, 1943.   S. F. LLOYD   2,337,117
FOOD PREPARING AND VENDING MACHINE
Filed July 21, 1942   8 Sheets-Sheet 4

INVENTOR.
Samuel F. Lloyd
BY
ATTORNEY.

Dec. 21, 1943.   S. F. LLOYD   2,337,117
FOOD PREPARING AND VENDING MACHINE
Filed July 21, 1942   8 Sheets-Sheet 5
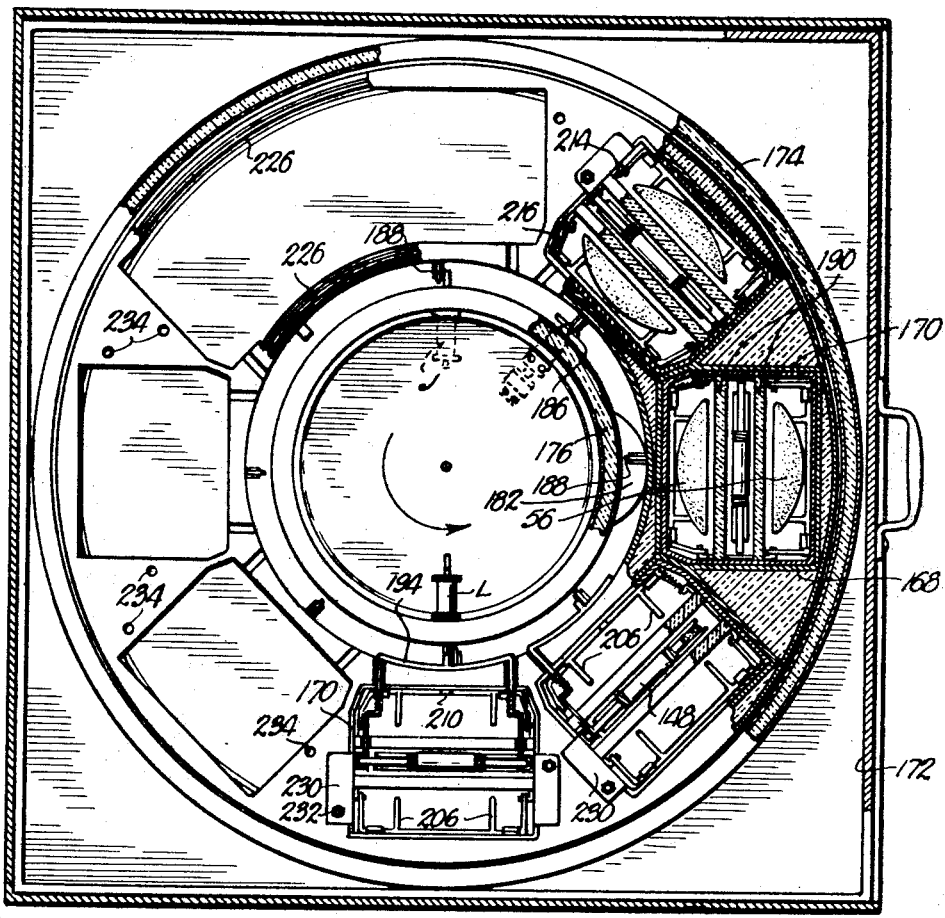
Fig. 7.
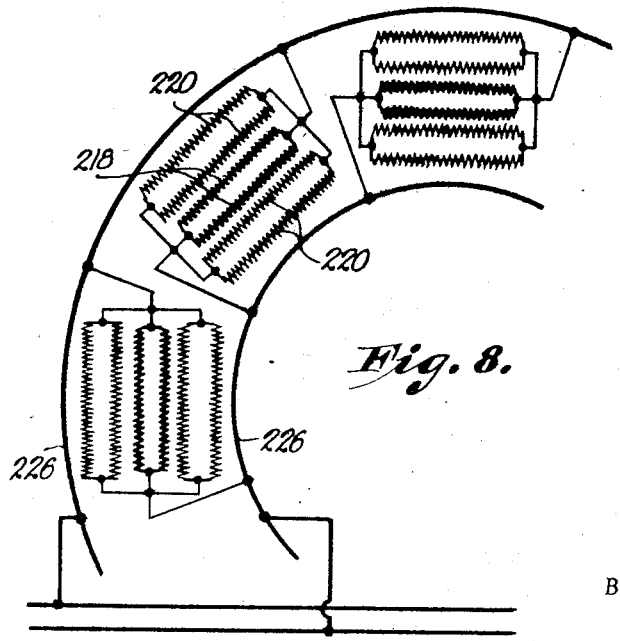
Fig. 8.
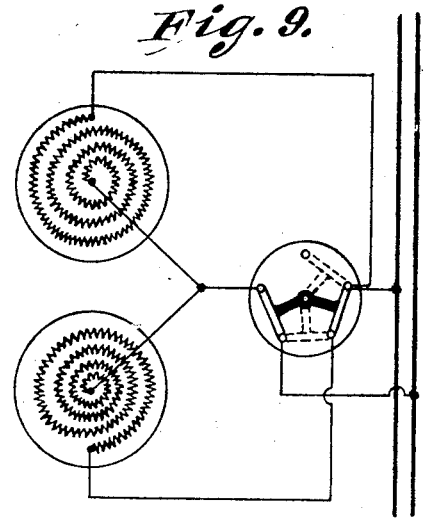
Fig. 9.
INVENTOR.
Samuel F. Lloyd
BY 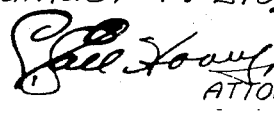
ATTORNEY.

Dec. 21, 1943.     S. F. LLOYD     2,337,117
FOOD PREPARING AND VENDING MACHINE
Filed July 21, 1942     8 Sheets-Sheet 7
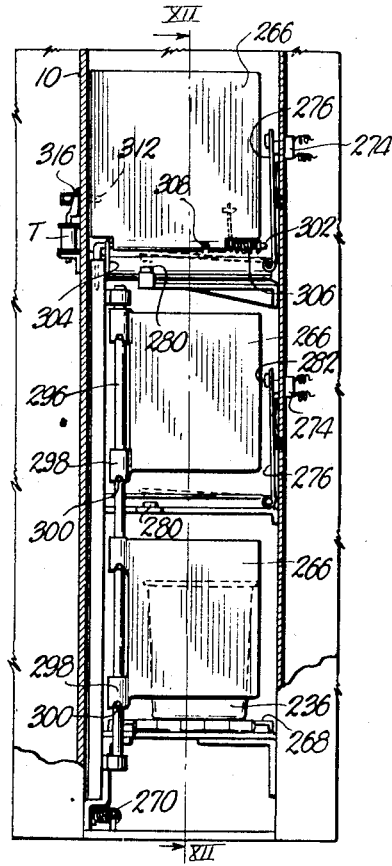
Fig. 11.
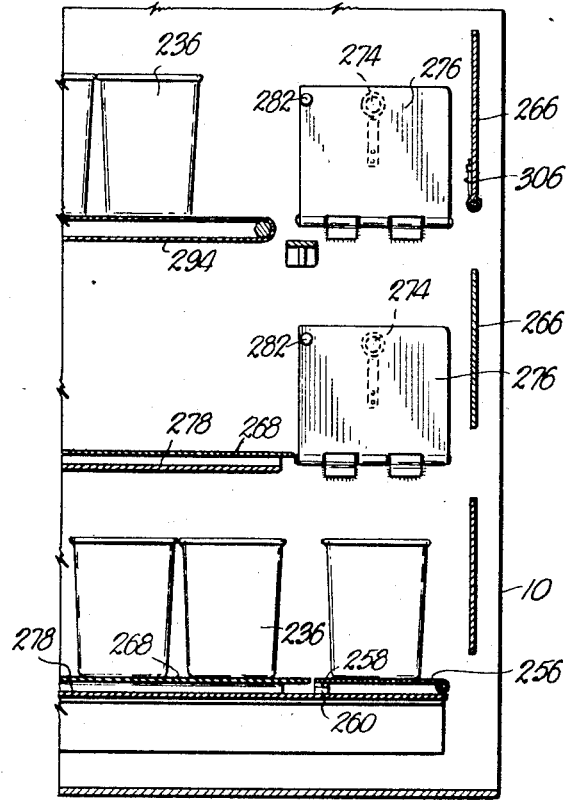
Fig. 12.
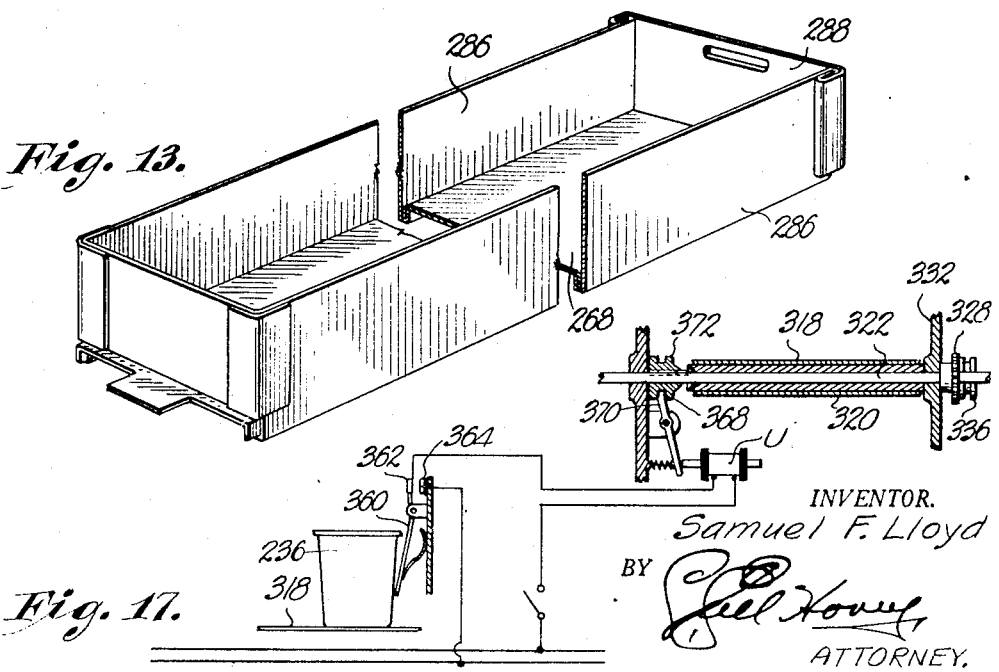
Fig. 13.
Fig. 17.
INVENTOR.
Samuel F. Lloyd
BY 
ATTORNEY.

Dec. 21, 1943.　　　　　S. F. LLOYD　　　　　2,337,117
FOOD PREPARING AND VENDING MACHINE
Filed July 21, 1942　　　8 Sheets-Sheet 8
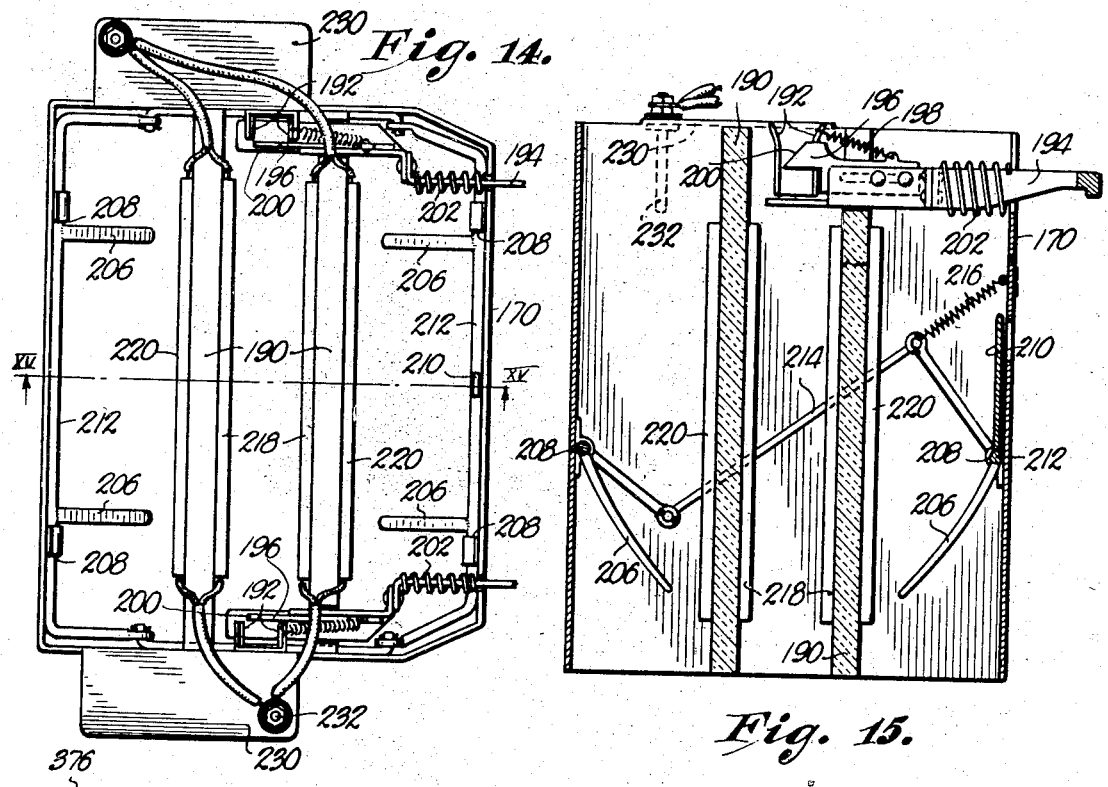
Fig. 14.
Fig. 15.
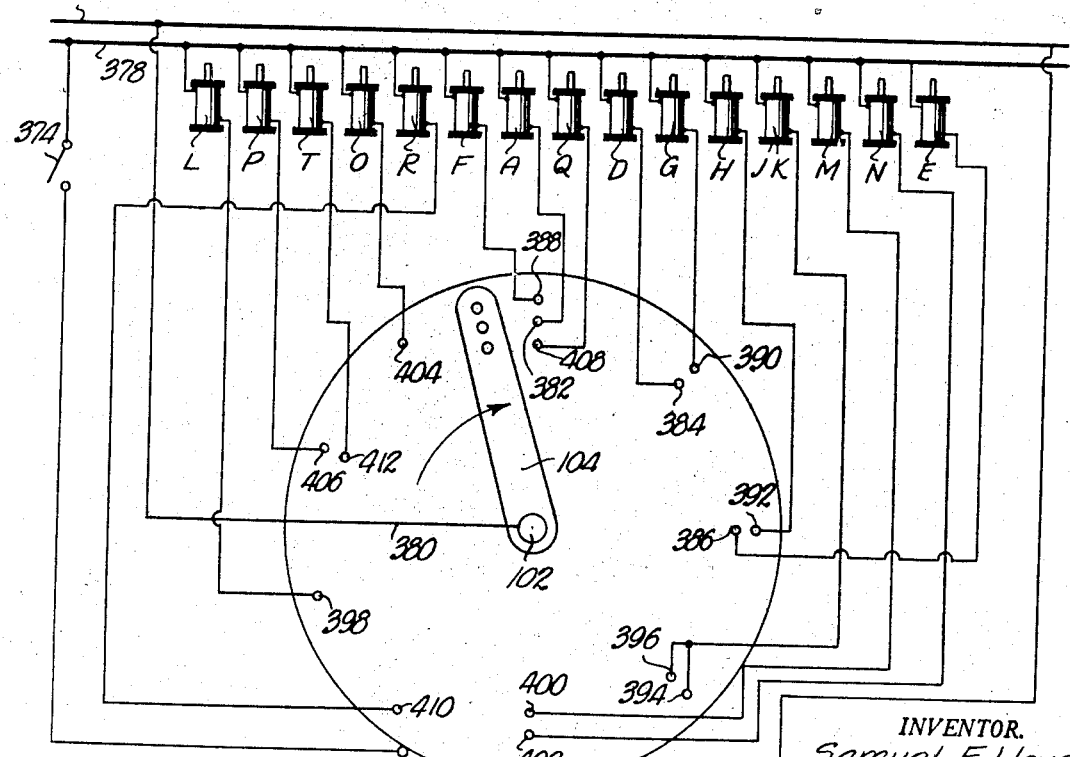
Fig. 16.
INVENTOR.
Samuel F. Lloyd
BY
ATTORNEY.

Patented Dec. 21, 1943

2,337,117

UNITED STATES PATENT OFFICE 2,337,117

FOOD PREPARING AND VENDING MACHINE

Samuel F. Lloyd, Junction City, Kans.

Application July 21, 1942, Serial No. 451,805

19 Claims. (Cl. 107—1)

This invention relates to food handling and preparing apparatus, and specifically to a machine for making sandwiches from sliced food of different characteristics, and the primary object is to provide automatic apparatus designed to store sliced food of different kinds, feed said stored food slices in proper sequence to an oven where the same is cooked, discharge the cooked slices from said oven into appropriate receptacles, store said receptacles after having a sandwich disposed therein, and then maintain the receptacles in the collecting space where the same may be available to the consumer.

Another primary object of this invention is to provide a machine for preparing food in sandwich form, which machine is provided with automatic means for feeding the sliced food to an oven for discharging the cooked sliced food from the oven, and for moving an empty receptacle to a place where the prepared food is packaged therein.

This invention has for a yet further aim to provide in a machine of the aforementioned character, an unique storage magazine for sliced food of one character, which magazine has means for imparting step-by-step movement thereto whereby at least one slice is periodically discharged therefrom.

Another object of this invention is to provide a storage chamber for sliced food of a character different from that in the storage magazine, which sliced food in said storage chamber is fed from the latter through the employment of unique parts arranged to periodically introduce one slice of the food in an oven with sliced food from the storage magazine, whereby both of the assembled slices may be simultaneously cooked and thereafter discharged from the oven forming a part of the machine, for use by the consumer.

An even further aim of the instant invention is to provide a food preparing machine having the aforementioned characteristics and in which machine is embodied a specially designed oven, characterized by its ring-shaped form and having a number of sections, each insulated from the rest, and within which a plurality of sliced food is cooked while the oven rotates about the axis thereof.

This invention has for a still further object to provide electrically operated apparatus for controlling the discharge of sliced food from the aforesaid storage magazine and storage chamber, the discharge of the cooked sliced food from the aforesaid specially designed oven, the placement of an empty receptacle where the cooked sliced food may enter the same, and the movement of the filled receptacle to a collecting space, all of which electrical apparatus will work in timed relation through the medium of a distributor head, forming a part of the machine, whereby smooth, uninterrupted and properly timed movements will complete a number of cycles, each capable of presenting to the consumer a prepared sandwich or the like.

Another object of this invention is to provide a machine for preparing sliced food and for making sandwiches having a storage chamber for sliced food, each of which slices is confined in a holder, which holder remains associated with the slice therein until after said slice is cooked in the aforesaid oven, and further, until the slice is freed from the holder by a specially designed mechanism for the purpose, said machine having means for discharging the holder from the case for re-use after the slice has been removed therefrom.

A further object is to provide a machine of the aforesaid character, having a series of collecting units for the cooked slices after they have been dropped into a receptacle, said series of units being provided with means for automatically directing the filled receptacles to an empty unit after the adjacent unit has been filled.

This invention embodies a large number of minor objects, many of which are portions of the principal aims above set down and all of which will appear during the course of the following specification, referring to the accompanying drawings wherein:

Fig. 7 is a cross sectional view taken on line

Figure 3:
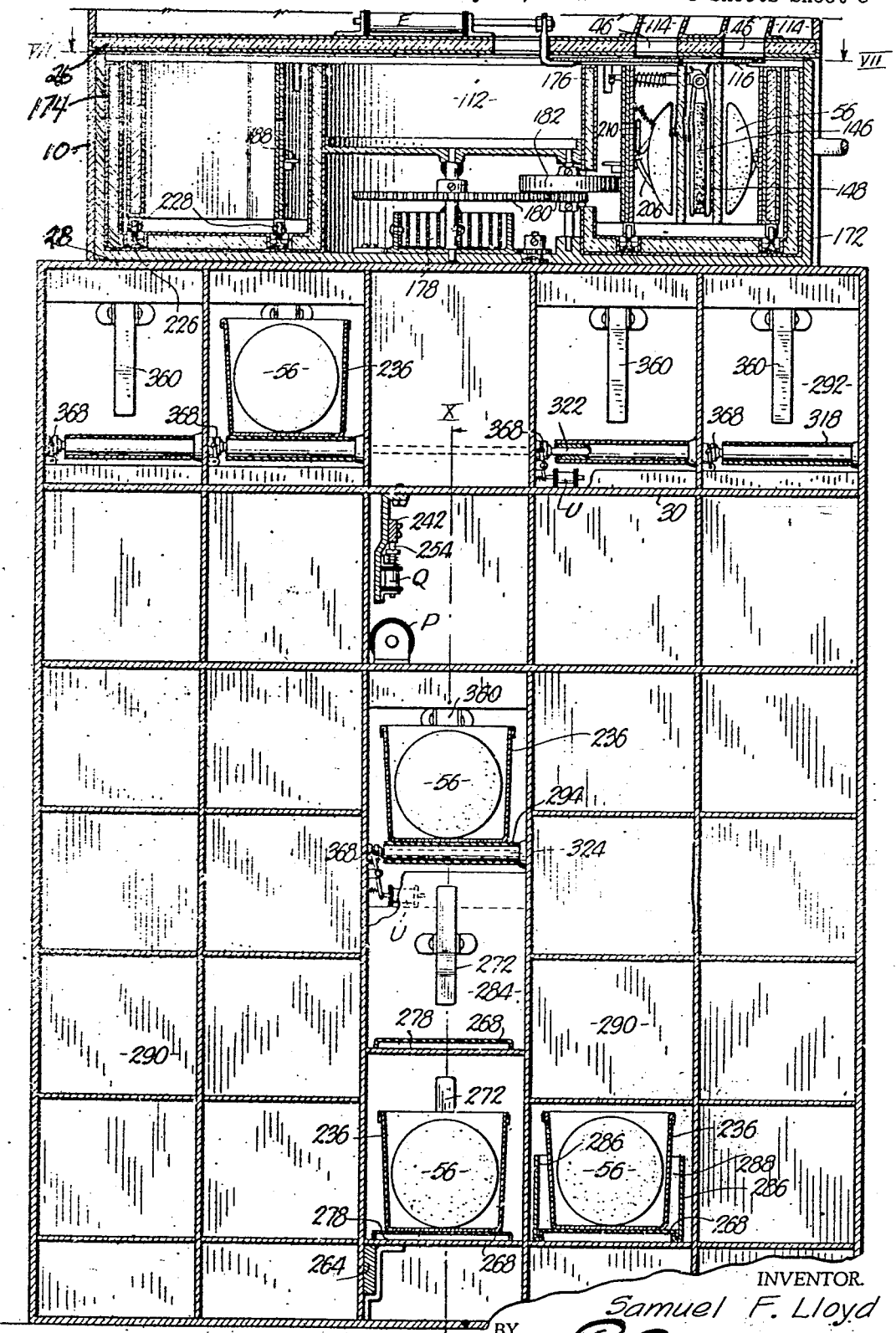
Fig. 3 is a vertical central fragmentary sectional view through the lower portion of the machine and being a continuation downwardly of Fig. 1.

VII—VII of Fig. 3, looking in the direction of the arrow.

Fig. 8 is a fragmentary schematic view illustrating the heating elements of the oven shown in Fig. 7.

Fig. 9 is a diagrammatical view illustrating the manner of varying the heat generated in the individual sections of the oven.

Figures 10, 10A:
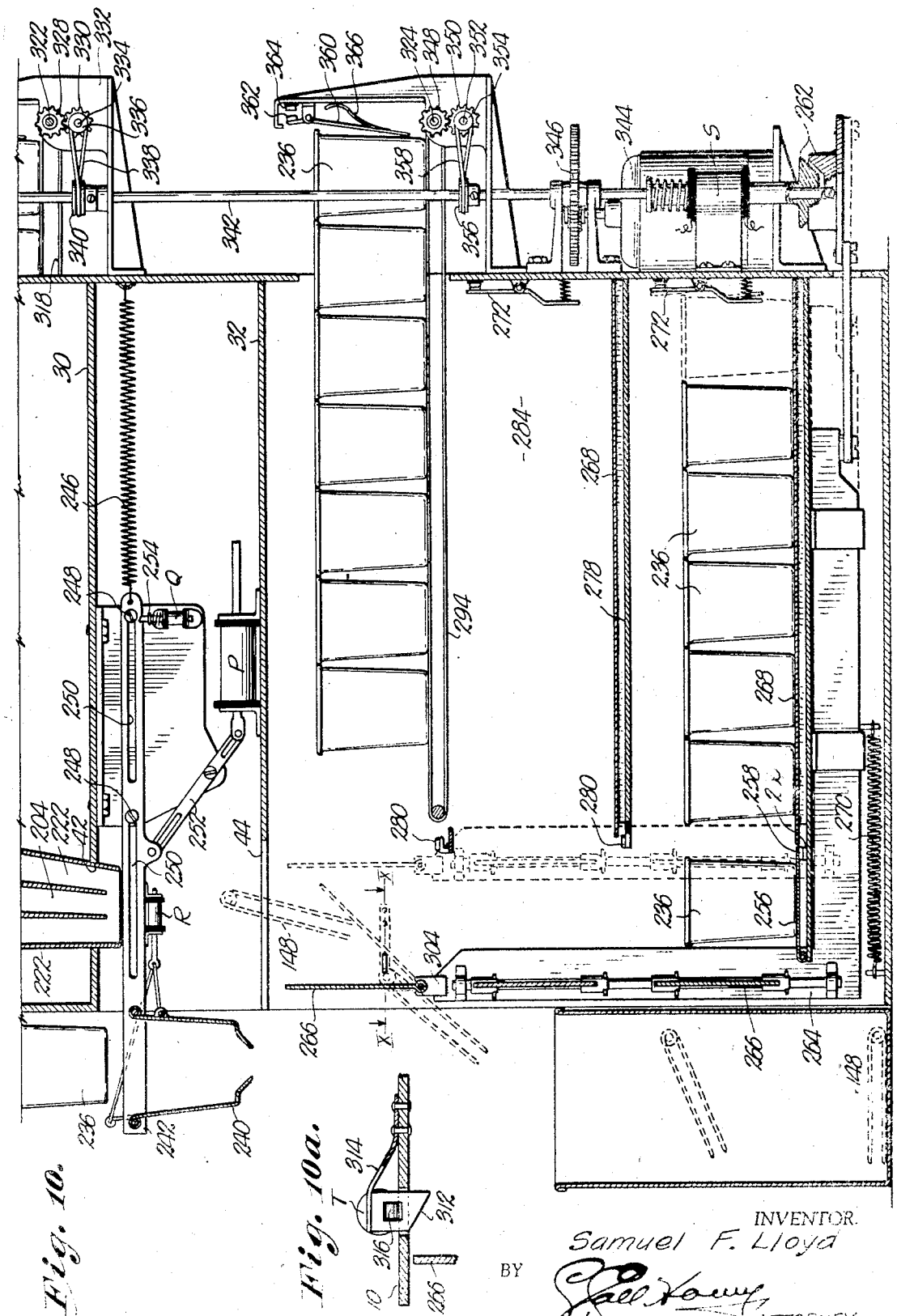

Fig. 10 is a fragmentary vertical central sectional view through the lowermost portion of the machine immediately below that portion shown in Fig. 2.

Fig. 10a is an enlarged detailed sectional view taken on line X—X of Fig. 10.

Fig. 11 is a fragmentary front elevational view of the lower portion of the machine with the case wall broken away to reveal pusher plates.

Fig. 12 is a sectional view taken on line XII—XII of Fig. 11.

Fig. 13 is a perspective view of a drawer having as a part thereof, the floor from one of the collecting units.

Fig. 14 is a top plan view of a section from the oven.

Fig. 15 is a vertical sectional view through the oven taken on line XV—XV of Fig. 14, looking in the direction of the arrows.

Fig. 16 is a wiring diagram illustrating the manner of successively supplying current to the solenoids forming a part of the apparatus; and Fig. 17 is a diagrammatical view illustrating the manner in which conveyor belts are advanced in a step-by-step fashion upon the removal therefrom of the receptacles.

All the component parts of the machine may be housed within a case 20 that is transversely divided by horizontal partitions 22, 24, 26, 28, 30 and 32, having openings 34, 36, 38, 40, 42 and 44 respectively. In addition to opening 38 in partition 26, openings 46 are provided at a point 90° from opening 38.

The space within case 20 above partition 22 is partially occupied by refrigerating apparatus 48, the coils 50 whereof extend to within storage chamber 52 immediately below partition 22. That space above partition 22 is devoted to a storage magazine 54 for sliced food in the form of bread or bun halves 56.

Throughout the following specification, slices 56 shall be designated "bun sections," but it will be understood that any form of sliced food capable of producing a sandwich or an edible composite product, is contemplated by the invention.

The character of bun sections 56 is different from the sliced food confined within storage chamber 52 in that it takes less time to prepare the same for consumption by cooking.

Storage magazine 54 contains a cylindrical housing 58 for refrigerating apparatus 58 and the hereinafter described driving means.

A revolvable cylinder 60 is hung upon housing 58 through the medium of ball-bearings or similar parts 62. A ring shaped magazine 64 circumscribes housing 58 and is hung directly upon cylinder 60 through the medium of downturned ears 66 which enter complementary notches formed in the upper edges of cylinder 60.

Figure 4:
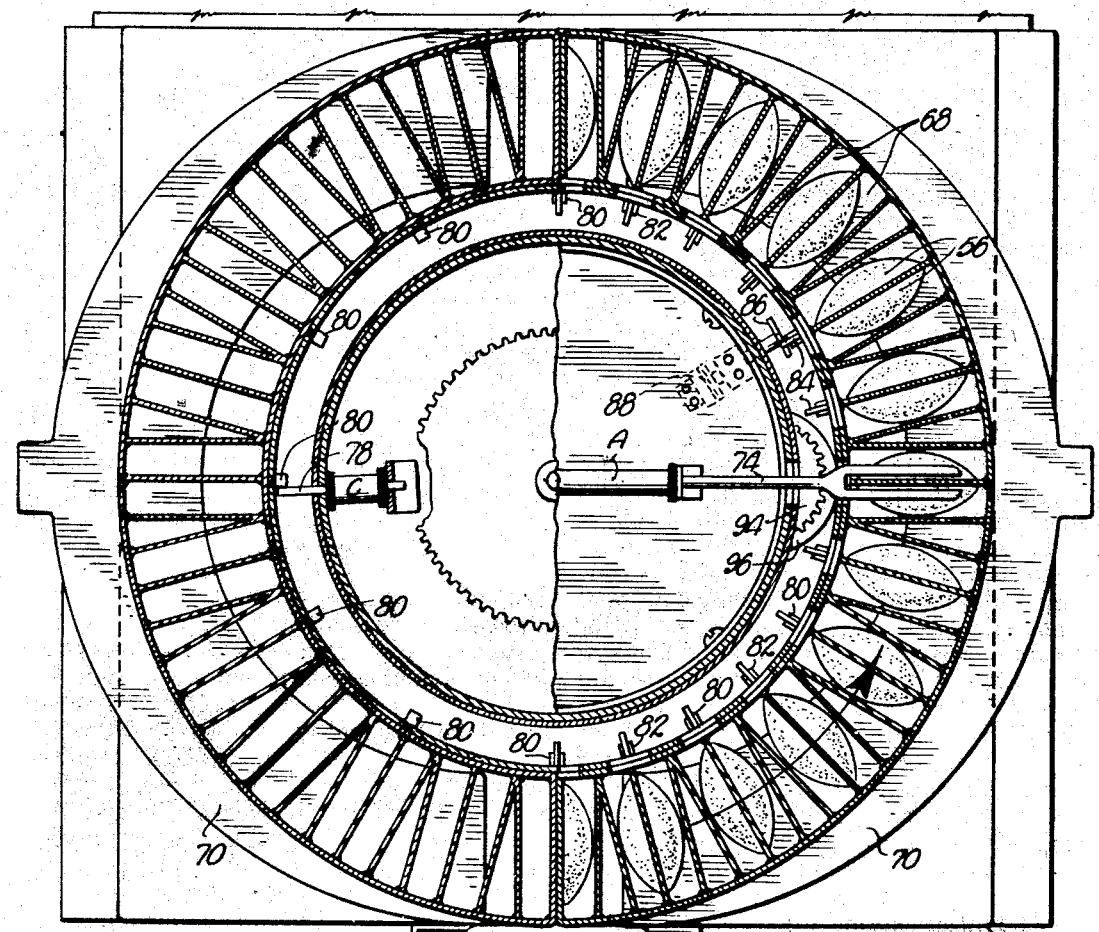
Fig. 4 is a cross sectional view through the machine taken on line IV—IV of Fig. 1, looking in the direction of the arrow.

Ring-shaped magazine 64 is segmental in character in that the same is constructed of two semi-circular parts divided into compartments 68 formed to receive in stacked relation, the several bun sections 56. The manner of abutting the vertical edges of the sections of magazine 64 is clearly illustrated in Fig. 4, as are the auxiliary plates 70 employed when loading compartment 68. The magazine 64 may be filled with bun sections 56 and later associated with the machine by hanging the same on cylinder 60. Thus, during the continuous operation of the machine, an empty section of magazine 64 may be independently removed and a filled section placed in its stead.

When filling the sections apart from the machine, plates 70 bottom the customarily open bottomed compartments 68. These compartments 68 are all floored by partition 22 with the exception of one compartment which overlies opening 34, but which opening is closed under certain conditions by gate 72. A detent 74 is plunger type in character and movable to and from the operative position shown in Figs. 1 and 4 by a solenoid A. Detent 74 assumes the illustrated position only when the ring-shaped magazine 64 is in a stationary position due to the action of one or the other of solenoids B or C, as the case may be, the armatures 76 and 78 of said solenoids B and C respectively, being movable in timed relation into the path of travel of a series of stops 80 arranged in an annular path opposite to solenoids C and a series of similar stops 82 arranged in an annular path opposite to solenoid B. Armatures 76 and 78 are normally in the position shown in Fig. 1 where one or the other lies against stops 80 or 82. These said stops are in staggered relation, that is, there is a stop 80 in the lower series thereof by every other compartment 68 in magazine 64, and a stop 82 in the upper series thereof for the intervening compartment 68. There is however, a pin 84 for each compartment 68, extending radially inwardly from storage magazine 74, which strikes star wheel 86 and causes reversing switch 88 to energize solenoid C when the parts are in the position shown in Fig. 1. This energization withdraws armature 78 from behind stop 80 and allows magazine 64 to move one step or until the next succeeding stop 82 in the upper row thereof, strikes armature 76 of solenoid B. By the same token, when the next pin 84 operates star wheel 86, it will energize solenoid B to withdraw its armature 76 from behind the upper stop 82 and allow the magazine 64 to advance another step.

The motivating force for magazine 64 is a spring motor 90 that is wound by conventional key 92. A gear train 94 imparts movement to friction wheel 96, the periphery whereof bears against the inner annular periphery of revolvable cylinder 60, the friction whereof is overcome when either of the armatures 76 or 78 are in engagement with a stop 80 or 82.

Figure 1:
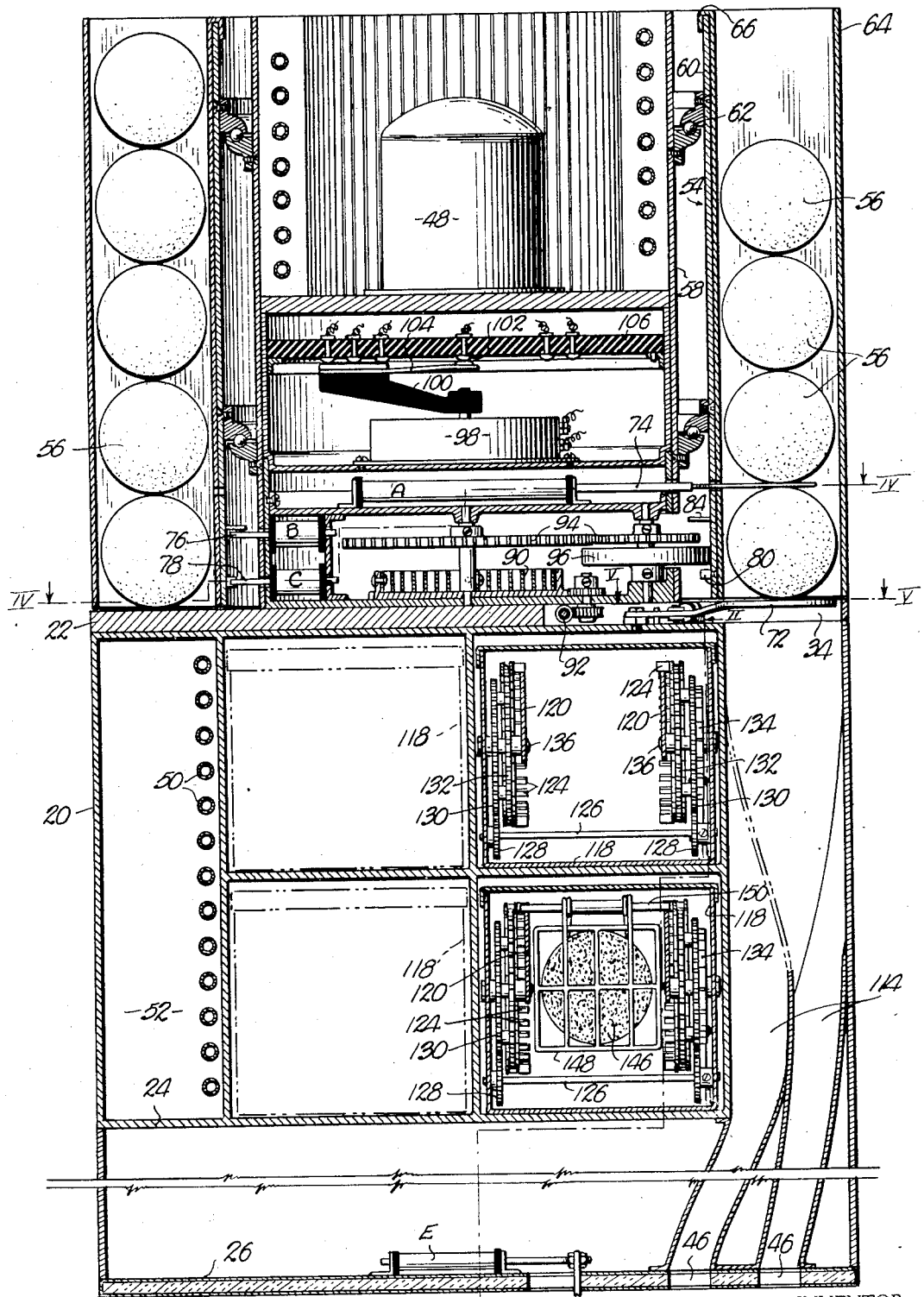
Fig. 1 is a vertical fragmentary central sectional view through the upper portion of a machine for preparing sliced food, made in accordance with the present invention.

An electric clock 98 drives arm 100 over all of the contacts, shown in Fig. 16 and in part in Fig. 1. Central contact 102 in connection with arm 100, is always engaged by a strip of conducting material, or arm, 104, secured to arm 100, which is of insulating material as is the block 106 which supports the several contacts to be hereinafter numerically designated. Block 106 together with the many contacts supported thereby, and the strip 104, becomes a distributor head for timing all of the electrical parts of the machine.

The opening 34 is guarded by gate 72 which in turn is movable about a pivotal connection 108 on partition 22 by solenoid D. Spring 110 normally maintains gate 72 in a position to close opening 34. When gate 72 is open, detent 74 is in position to support all bun sections 56 above the lowermost bun sections in the partitioned compartment 68 immediately above opening 34. When gate 72 is opened, two bun sections 56 will drop through opening 34 and be led to a cooking space 112 within case 20.

The chutes 114 interconnect opening 34 and openings 46, the latter being in partition 26 and controlled by a gate 116. This gate is actuated by solenoid E mounted upon partition 26.

Storage chamber 52 is refrigerated by coils 50 extending from refrigerating apparatus 48 and contains a number of drawers 118, each provided with opposed shelves 120 over which rides an endless chain 122 upon which is mounted laterally extending ears 124. There is a chain 122 along each side of each drawer 118 and said chains are simultaneously driven through the intermediacy of transverse shafts 126 upon which is mounted a pinion 128 in mesh with gears 130 adjacent to each sprocket wheel 132 at each side of the drawer 118. A ratchet 134 mounted on stub shaft 136 at each side of the drawer is engaged by the armature 138 of solenoid F.

Step-by-step motion is imparted to sprocket chain 122 by the periodic energization of solenoid F and when such action occurs, sprocket 132 will be driven and chain 122 will ride over idlers 140 near one end of drawer 118. An opening 142 in the bottom of drawer 118, is in communication with opening 38 in partition 26 by way of chute 144.

When slices of meat 146 are deposited within storage chamber 52, they are placed in specially designed holders 148. Each holder comprises a shaft 150, the ends whereof are confined between ears 124 as said ends rest upon the upper edges of shelves 120. When the chain 122 moves one of holders 148 off of shelves 120, the holder together with the contained slice 146 will drop by gravity into chute 144 where it comes to rest upon gate 152 normally closing opening 38.

Light springs 154 yieldably maintain the sides of U-shaped holder 148 in place against slice 146. In this instance, slice 146 is meat and sometimes the meat is in a ground condition requiring the efforts of holder 148 to maintain the slice in a unitary condition, therefore, throughout the following specification, this slice 146 may be referred to as a slice of meat or merely as the "slice," which is confined within holder 148.

It is important that drawers 118 be unitary and removable from within storage chamber 52 for the purpose of maintaining the machine in constant operation. Suitable electrical connections may be made in any conventional manner to solenoids F.

Figures 5, 6:
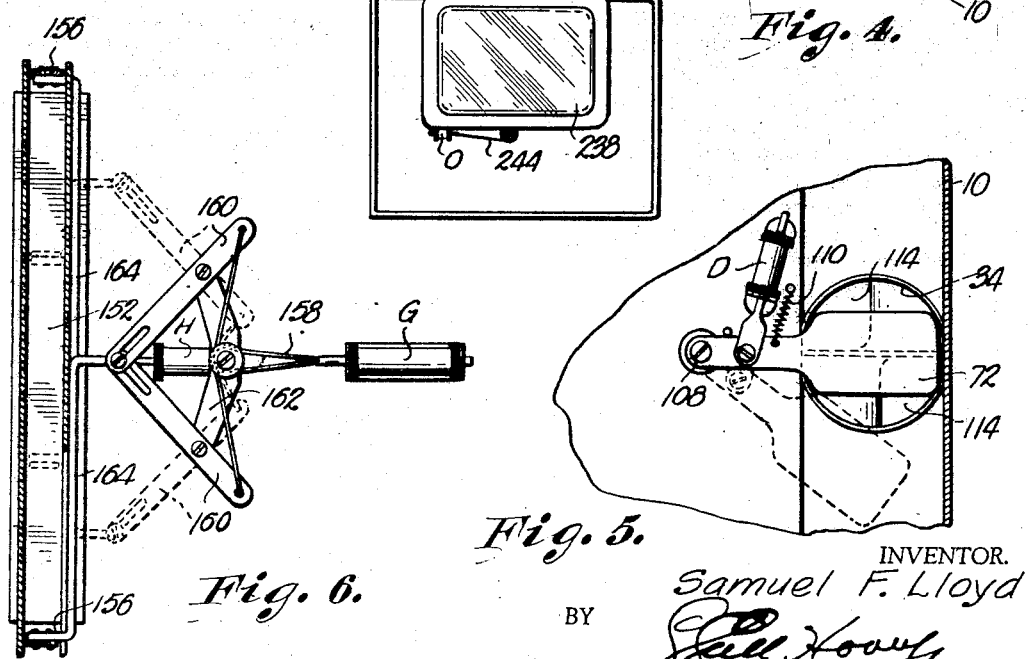
Fig. 5 is a fragmentary detailed sectional view taken on line V—V of Fig. 1, looking in the direction of the arrow.
Fig. 6 is a fragmentary detailed sectional view taken on line VI—VI of Fig. 2.

In the illustrated embodiment of the invention four drawers 118 have been shown; two in a lower tier and two in an upper tier. The width of two drawers is substantially the same as the width of chute 144, but since the width of the hereinafter described oven section is approximately the same as the width of slice 146, it is necessary to automatically draw the slice and holder 146 and 148 respectively, to a position immediately above opening 38 which will permit the holder to drop into the oven section. To accomplish this object mechanism such as detailed in Fig. 6 is employed. Vertical plates 156 reciprocate toward and from each other within chute 144 and to and from the position shown in dotted lines of Fig. 6. When plates 156 are in the position shown in dotted lines, holder 148 may drop by gravity into the oven section if gate 152 is withdrawn to clear opening 38.

The movement of plates 156 is accomplished through the action of solenoid G connected to plates 156 by way of cables 158 and links 160. This linkage is carried by bracket 162. Connections 164 extending from plates 156 to the slotted ends of links 160, complete the arrangement of parts here illustrated, to indicate one manner of shifting slice 146 and its holder 148 to a point above opening 38. At the appropriate time, solenoid H will be energized to draw gate 152 from beneath the overlying slices 146.

Care should be taken to introduce slice 146 at a point at least 90° from the lower ends of chutes 114 where bun sections 56 are introduced into the cooking space.

The cooking space 166 in case 20 is occupied by a ring-shaped oven 168 comprising a number of sections 170, each removable by lifting the same upwardly after the ring-shaped oven 168 has been removed from within case 20 by withdrawing the entire drawer 172 supporting the oven. The walls of ring-shaped oven 168 should be made of heat resisting material and the sections 170 arranged in a circumscribing annular path between an outer and an inner stationary wall 174 and 176 respectively.

Sections 170 are moved as a body about the axis of the ring-shaped oven 168 through the medium of mechanism precisely the same as described with respect to the movement of ring-shaped magazine 64. A spring motor 178 drives a train of gears 180, which in turn rotates friction wheel 182, the periphery whereof is in frictional engagement with the inner periphery of the annular support for sections 170. Step-by-step movement is imparted to oven 168 in order that a dwell may occur when slices 146 are fed into and withdrawn from oven 168, and also while bun sections 56 are introduced and removed therefrom.

This step-by-step movement is accomplished through the medium of solenoids J and K alternately engaging ears 184 arranged in upper and lower paths opposite to the armatures of said solenoids J and K. A star wheel 186 actuated by a series of pins 188 controls the current to solenoids J and K in order that they may be energized intermittently to cause the step-by-step movement necessary to load and empty oven 168.

Each section 170 of oven 168 is designed to receive a slice 146 and two bun sections 56. Slice 146 confined within holder 148 is dropped into oven section 170 between partitions of insulated material 190.

A hanger of special nature is disposed between these partitions 190 to receive the ends of shaft 150. The hanger comprises guides 192 and a reciprocating element 194 upon which shiftable trigger 196 is carried. Element 194 is movable by solenoid L. When holder 148 drops into oven section 170 between partitions 190, trigger 196 is forced longitudinally against the action of spring 198 because shaft 150 strikes the inclined face 200 of said trigger. Trigger 196 immediately moves back above the end of shaft 150 to preclude upward displacement thereof.

When slice 146 is to be released from holder 148, solenoid L is energized and element 194 is withdrawn against the force of spring 202 whereupon the holder 148 will be dropped through central delivery chute 204. Simultaneously with the energization of solenoid L, solenoid M is energized to positively release bun sections 56 from within section 170.

Fingers 206 pivotally mounted as at 208 to the side of oven section 170 and normally extending downwardly and inwardly, as illustrated in Fig.

15, are simultaneously moved by solenoid M. The armature of this solenoid M projects into oven section 170 through openings shown in Fig. 2 and strikes extension 210, rigid to shaft 212 interconnecting fingers 206. A link 214 joins fingers 206 in a manner shown in Fig. 15 and a spring 216 yieldably maintains these fingers 206 in a normal position where bun sections 56 are carried thereby.

Each oven section 170 is equipped with heating elements illustrated in Fig. 14 and shown diagrammatically in Fig. 7. It is preferred that the heating elements 218 be capable of imparting a relatively high amount of heat to slice 146 while coils 220 impart head of less intensity to bun sections 56. If desired, coils 220 may be duplicated so that there is a heating coil on each side of each bun section 56. Such is the nature of the apparatus diagrammatically revealed in Fig. 8. When fingers 206 are moved by solenoid M, as before described, bun sections 56 are dropped through chutes 222.

To release slice 146 at the same time bun sections 56 are released, there must be provided a solenoid N, which controls spreader 224 movable to and from a position between the sides of holder 148. This spreader 224 is near one end of the holder in order to permit slice 146 to drop therefrom without interference.

Sufficient electrical energy must be supplied to heating coils 218 and 220 as the ring-shaped oven 168 is moved about its axis of rotation. To accomplish this, the unitary portion of the oven between walls 174 and 176, and including oven sections 170, is mounted upon tracks of conducting material 226 and rollers 228. Obviously, these tracks 226 must be insulated from the remaining portion of the mechanism by conventional means, such as that shown in Fig. 2.

Each section 170 has a flange 230 upon which is mounted a post 232 for entrance into a socket 234. The relation between posts 232 and sockets 234 is the same as that usually established in electrical appliances to cause positive electrical contact when the posts are in the sockets. The structure forming sockets 234 is electrically connected to rollers 228 and obviously, tracks 226 are in turn joined to a source of electric current as diagrammatically shown in Fig. 8.

Receptacles 236, for the prepared superposed slices, are kept in hopper 238 hung on case 20 adjacent to and in operative relation with the sectional basket 240 mounted on bar 242. Basket 240 is shiftable from a position beneath delivery chutes 204 and 222, and when at one end of its path of travel, is beneath hopper 238 to receive a receptacle 236 as illustrated in Fig. 10.

The conventional mechanism of cup feeding machines may be used and when such is done, that mechanism is operated to deliver a receptacle 236 by solenoid O. This solenoid draws cable 244 to the extent required to release receptacle 236 and allow the same to drop into basket 240.

Figure 2:
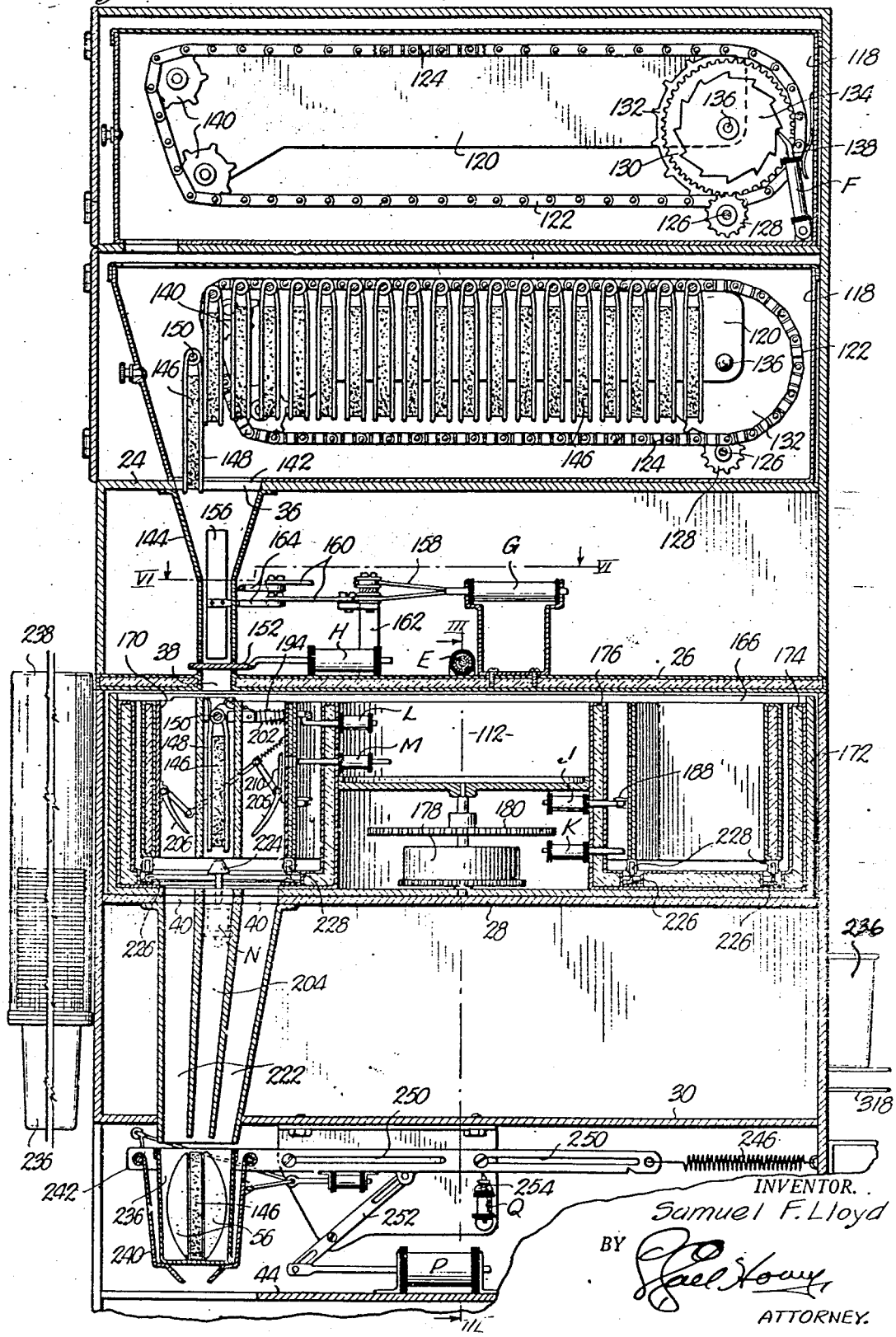
Fig. 2 is an irregular vertical fragmentary sectional view taken on line II—II of Fig. 1.

Bar 242 is maintained in the normal position shown in Fig. 2 by spring 246, one end of which is secured to case 20 while the other end is fastened to bar 242, as shown in Fig. 10. Supporting and guide screws 248 ride in complementary slots 250 of bar 242. Solenoid P connected to bar 242 through the medium of slotted link 252 moves bar 242 to the position shown in Fig. 10 against the energy of spring 246. After bar 242 has reached this said position, latch 254 comes into play to maintain the bar stationary and until solenoid Q is energized. Bar 242 must remain in this position to receive a receptacle 236 from hopper 238. When solenoid Q has been energized to withdraw latch 254, spring 246 will return to the position shown in Fig. 2, whereupon slice 146 between bun sections 56 will be dropped for the next step in the cycle of operation.

After the sandwich consisting of slice 146 and two bun sections 56 has entered receptacle 236, solenoid R will be energized to open basket 240 and allow the receptacle with its contained sandwich to drop by gravity onto platform 256.

The weight of receptacle 236 and its contents will depress platform 256 and close points 258 and 260 in the circuit which supplies electrical energy to solenoid S, whereupon clutch 262 will be engaged and caused to draw pusher mechanism, broadly designated by the numeral 264, to the position shown in dotted lines of Fig. 10. One of the flaps 266 on pusher 264 will engage receptacle 236 and move the same to a place on floor 268 and off of platform 256. The removal of receptacle 236 from platform 256 will permit contact points 258 and 260 to operate and thereupon deenergize solenoid S to disengage clutch 262. When such is done, 270 will retrieve the pusher mechanism 264.

When a train of receptacles 236 has been deposited upon floor 268, switch 272 will be opened by the engagement therewith of one of receptacles 236. This switch 272 is in a circuit energizing electro-magnet 274 of hingedly mounted platform 276, shown in Fig. 12, which is next above floor 268. When such de-energization occurs, platform 276 will drop to the horizontal position and be a continuation of the floor 278.

A switch point 280 and a switch point 282 will be normally held apart, as is the case with switch points 258 and 260, when a receptacle 236 is dropped upon platform 276. Solenoid S will be again energized and the pusher mechanism 264 will shift to the dotted line position, the same as above mentioned. The flap 266 on pusher mechanism 264 in alignment with the receptacle just dropped upon platform 276, will serve to move the receptacle on to floor 278 and that floor will be filled the same as mentioned with respect to floor 286.

Collecting space 284 within case 20 is occupied by floors 268 and 278 in the embodiment just described, and when a supply of cooked sandwiches is being prepared for a heavy demand, the machine will continue to operate and fill these floors so long as the operator removes receptacle 236 therefrom by making a drawer of floors 268 and 278 such as shown in Fig. 13. Either floor 268 or 278 is slipped into side walls 286, after which a front wall 288 is moved into a position to lock all parts together. After the drawer is removed from collecting space 284, another floor is set upon the shelves therein to be refilled. The completed drawer is stored in any one of a number of warmed compartments 290 located on either side of collecting space 284.

When it is desired to deliver to the consumer directly without storing receptacles 236, they are disposed upon belts to be delivered to one side of the machine where the receptacles may be lifted from said belts.

As indicated in Figs. 3 and 10, the relatively high central compartment comprises the heretofore mentioned collecting space 284. Compartments 290 to each side of this collecting space receive for storage the drawers filled with loaded receptacles. The manner of presenting for delivery the filled receptacles 236 may be either through the direct operation of the machine or by introducing into compartments 292, a quantity of pre-prepared food in the receptacles 236.

When causing the normal operation of the machine to maintain a receptacle 236 at the forward end of belt 294, said belt is disposed in the upper part of collecting space 284. Uppermost platform 276 (Fig. 12), is dropped to the horizontal position, by the de-energization of electromagnet 274. This electro-magnet is energized through a circuit having another switch 272 therein, which, when the floor 278 immediately below belt 294, is filled from either end with receptacles 236. Flap 266, in alignment with the row of receptacles 236 on floor 278 and disposed on pusher mechanism 264, will exert pressure against the row of receptacles 236 to open this said switch 272. When the switch is opened to break the circuit, and the upper magnet 274 is de-energized, upper platform 276 will drop to the horizontal position, as shown in dotted lines of Fig. 11, to be in horizontal alignment with the upper stretch of endless belt 294.

As before described, this upper platform 276 has a switch point 282 cooperating with switch point 280 in circuit with solenoid S to cause pusher mechanism 264 to move the dropped receptacle 236 from this upper platform 276 onto belt 294. The manner of engaging clutch 262 is the same as before described.

All of flaps 266 on pusher mechanism 264 are hinged to afford access to the three divisions of collecting space 284, shown in Fig. 10, for example. The two lower flaps 266 swing about the axis of rod 296 on pusher mechanism 264 and the bearings 298 are notched to engage cross pins 300. When the notched bearings 298 engage pins 300, flaps 266 cannot move from their normal position. If it is desired to remove either of the floors 278 from the collecting space, the appropriate flap 266 is slightly raised longitudinally along rod 296 to permit rotation.

The uppermost flap 266 is of a slightly different structural character in that it is hingedly mounted upon a horizontal L-shaped shaft 302, one leg whereof is slidably mounted in a cavity in the upper end of one of the elements of pusher mechanism 264 (Fig. 11). To swing this upper flap 266 out of the way to afford access to that portion of the collecting space above belt 294, L-shaped shaft 302 is lifted from engagement with a notch in saddle 304, whereupon pivotal movement about a vertical axis is permitted.

A spring 306 coiled about shaft 302 yieldably maintains flap 266 in its normal vertical plane against a radial stop pin 308. This pin is rigid to shaft 302 and extends outwardly through a segmental slot formed in that portion of flap 266 coiled about shaft 302. Thus, this flap may move forward to the position shown in dotted lines of Fig. 10, but cannot move past the vertical position shown in full lines of said figure when spring 302 forces the same back to its vertical condition.

This upper flap 266 serves a dual purpose in that it deflects holders 148 to a point of collection outside of case 20. The manner of employing flap 266 as a deflector is in the nature of a latch 310 having an inclined face 312 against which the edge of flap 266 is forced when pusher mechanism 264 is drawn toward the dotted line position shown in Fig. 10. A supporting spring 314 carried by one of the partitions of case 20 maintains latch 310 in a normal position in the path of travel of flap 266. As the pusher mechanism 264 is moved to the right (Fig. 10), latch 310 is forced out of the way of flap 266, passes said latch, whereupon the latter will return to its normal position to strike flap 266 as pusher mechanism 264 returns to its normal position. Upper flap 266 will lie in an inclined position immediately below chutes 204 and 222 to deflect a holder 148 from within case 20. When this step in the cycle of operation has been completed, solenoid T will be energized by the movement of the distributor head and thereby force its wedge-shaped armature 316 upwardly to withdraw latch 310 from its position where upper flap 266 is held in the inclined position.

The manner of maintaining filled receptacles 236 at the forward end thereof for delivery to the consumer, is the same as the apparatus employed for maintaining filled receptacles 236 at the forward end of belt 294 in collecting space 284. Each compartment 292 is floored by an endless belt 318 of precisely the same nature as belt 294. The forward end of each belt 318 and belt 294 passes around a sleeve 320 mounted for free rotation upon shaft 322. A similar shaft 324 supports sleeve 326 at the forward end of belt 294. A gear 328 keyed to shaft 322 is in mesh with gear 330 rotatably mounted on bracket 332 through the medium of stub shaft 334. A pulley 336 on shaft 334 has belt 338 passing thereover. This belt extends over pulley 340 on vertical shaft 342 driven constantly by motor 344 through the medium of gear train 346. Shaft 324 is driven through the medium of meshing gears 348 and 350, the latter being on stub shaft 352 whereon pulley 354 is mounted. Another pulley 356 has belt 358 extending thereover to transmit power to gears 348 and 350.

Vertical shaft 342 is constantly driven by motor 344 and upper belts in compartments 292 are individually connected to shaft 322 by solenoid operated clutches, shown in Figs. 3 and 17. Switches 360 at the forward end of all endless belts 318 and belt 294, have contact points 326 and 364 that are normally held open by receptacles 236. A spring 366 forces these contacts 362 and 364 together when the forward receptacle 236 is lifted from any of the belts. When this is done, the belts are moved to present the next succeeding receptacle 236.

When points 362 and 364 are brought together to close the circuit, the appropriate solenoid U is energized to actuate a clutch, broadly designated by the numeral 368. This clutch is constructed as shown in Fig. 17 and comprises a fork 370 pivotally mounted to move member 372 along shaft 322 upon which it is splined. When member 372 engages the end of sleeve 320, the latter will be rotated to drive the belt passing thereover. As soon as points 362 and 364 are parted by a receptacle 236 striking the switch to depress spring 366, the clutch 368 will be disengaged and the belt controlled by said clutch, will remain in a stationary condition until the operation is repeated.

Electric clock 98 is driven when switch 374 is closed to supply current thereto from lines 376 and 378 (Fig. 16). Arm 104 connected to line 376 serves as a moving switch element and is connected by wire 380 to line 376. Solenoids A, D to H, J to R and T inclusive, are joined to line 378 as clearly shown in Fig. 16, and these said solenoids are in turn respectively connected to switch points 282 to 412 inclusive.

The position of arm 104, as illustrated in Fig.

16, indicates that it is approaching contact points 382, 388 and 408. When these points are reached, solenoids F, A and Q will be energized to advance movable rack 122 one step, in order that a holder 148 with a slice 146 may be dropped into chute 144; to extend detent 74 to the position shown in Figs. 1 and 4 to support the stack of bun sections 56 thereabove; and to withdraw latch 254 from the position shown in Fig. 10 that that position shown in Fig. 2, in order that bar 242 may be retrieved by spring 246.

Solenoid O has just been energized by arm 104 contacting points 404 to eject an empty receptacle 236 from hopper 238 and into basket 240, therefore, when bar 242 is moved back to the position shown in Fig. 2, an empty receptacle will be therein.

As arm 104 engages points 384 and 390, solenoids D and G will be energized to move gate 72 to the open position shown in dotted lines of Fig. 5, whereupon bun sections 56 below detent 74 will drop into chutes 114; and to move plates 156 toward each other in the manner set down above and illustrated in Fig. 6, to shift holder 148 which was dropped between plates 156 when arm 104 was in engagement with point 388 to drop a holder into chute 144.

Further movement of arm 104 in the direction of the arrow will contact points 386 and 392 to energize solenoids E and H to respectively open gate 116 in the lower ends of chutes 114 and to open gate 152 at the lower end of chute 144. Such action simultaneously drops two bun sections 56 and holder with its contained slice 146 into an oven section 170.

Points 394 and 396 are next engaged by arm 104 to energize solenoids J and K to withdraw the armatures thereof to release ring-shaped oven 168 for movement about its axis of rotation until again stopped by one or the other of the armatures of solenoids J and K. The passage of arm 104 beyond points 394 and 396 permits the return of these armatures to the position shown in Fig. 2, in order that the next succeeding ear 184 may be engaged. Such movement of the oven disposes a section 170 beneath chutes 114 to receive bun sections 56 and beneath chutes 144 to receive another slice 146.

When arm 104 engages points 400 and 402, solenoids M and N are energized to discharge toasted bun sections by actuating fingers 206 and the cooked slice 146 by forcing spreader 224 between the parts of holder 148. These movements cause the bun sections 56 to drop by gravity through chute 222 and the cooked meat slice 146 to drop through chute 204 into receptacle 236 held in basket 240, as above described. While ring-shaped oven 168 is stationary, arm 104 moves on to contact point 410 to energize solenoid R to open basket 240 and drop the filled receptacle 236 onto platform 256, either of platforms 276 or 266 as the condition of the collecting space dictates. The filled receptacle 236 of course, will be moved onto floors 278 as above set down or onto belt 294 if upper platform 266 is in the horizontal position. The movement of the pusher mechanism is not controlled by the distributor being described.

When arm 104 reaches contact point 398, solenoid L is energized to draw elements 194 from beneath the ends of shaft 150 to drop the emptied holder through chute 204, opened basket 240 and onto inclined flap 266, which has assumed the position shown in dotted lines of Fig. 10, because of the advancement of pusher mechanism 264 resulting from the dropping of a filled receptacle 236. The empty holder 148 is made available for re-filling and the oven section 170 is now ready to receive another holder, filled with slice 146.

Arm 104 now advances to engage contacts 406 and 412 to energize solenoids P and T to move bar 242 from the position shown in Fig. 2 to the position shown in Fig. 10, and to release latch 310 from behind flap 266, whereupon this flap will be returned by its spring 302 to the normal vertical position.

Arm 104 next advances to contact point 404 to energize solenoid Q to withdraw latch 254.

The operation from this point on has been previously described and constitutes one operating cycle. So long as current is supplied to the electrical parts of the machine, it will continuously perform, leaving only the matter of supplying bun sections 56 and slices 146 by the operator.

It is obvious that current may be supplied to solenoid S from any suitable source and likewise that solenoid U may be in the electrical circuit with switches 360 for operation independently of the distributor, all as diagrammatically shown in Fig. 17.

Solenoids B and C control the step-by-step advancement of ring-shaped magazine 64 and since the height of this magazine determines the number of bun sections 56 that may be held by each partitioned compartment 68, separate timing mechanism similar to that employed for controlling the remaining parts of the apparatus, may be supplied to perform precisely the same as described with respect to solenoids J and K.

Fig. 9 indicates in a diagrammatical fashion the manner in which the heating elements of the ovens may be coupled in series or parallel to vary the intensity of the heat generated therein.

The operation of the food preparing and vending machine has been made clear throughout the foregoing description, having regard to both the mechanical and electrical features thereof, and since machines having widely different physical characteristics than those illustrated and described may be produced, it is desired to be limited only by the spirit of the invention and scope of the appended claims.

Having thus described the invention, what is claimed as new and desired to be secured by Letters Patent is:

1. A machine for preparing sliced food of different characteristics comprising a case; partitions, having openings therethrough, dividing the case into a storage magazine for sliced food of one character, a storage chamber for sliced food of another character, and a cooking space; mechanism for periodically feeding at least one slice from the storage magazine to the cooking space; mechanism for periodically feeding a slice from the storage chamber; parts for directing said fed slices into the cooking space for cooking; and apparatus for discharging the cooked slices from the cooking space after the same have remained therein for a certain period of time.

2. A machine for preparing sliced food of different characteristics comprising a case; partitions, having openings therethrough, dividing the case into a storage magazine for sliced food of one character, a storage chamber for sliced food of another character, and a cooking space; mechanism for periodically feeding a slice from the storage chamber; parts for directing said fed slices into the cooking space for cooking; a delivery chute; means for periodically positioning a receptacle adjacent to the delivery chute to receive the slices therefrom; and apparatus for discharging the cooked slices from the cooking space into the delivery chute when a receptacle is positioned beneath the latter.

3. A machine for preparing sandwiches from sliced food of different characteristics, comprising a case; partitions dividing the case into a storage magazine for sliced food of one character, a storage chamber for sliced food of another character, and a cooking space, mechanism for periodically feeding at least one slice from the storage magazine to the cooking space; a holder for each of the slices of food in the storage chamber; mechanism for periodically feeding a holder and its contained slice from the storage chamber; parts for directing the said slices and holder into the cooking space; apparatus for automatically discharging the cooked slices from the holder and the cooking space after the same have remained in the latter for a certain period of time; and means for automatically discharging the holders from the cooking space after the slices have been discharged from the holders.

4. A machine for preparing sandwiches from sliced food of different characteristics, comprising a case; partitions dividing the case into a storage magazine for sliced food of one character, a storage chamber for sliced food of another character, and a cooking space, mechanism for periodically feeding at least one slice from the storage magazine to the cooking space; a holder for each of the slices of food in the storage chamber; mechanism for periodically feeding a holder and its contained slice from the storage chamber; parts for directing the said slices and holder into the cooking space; apparatus for automatically discharging the cooked slices from the holder and the cooking space after the same have remained in the latter for a certain period of time; and means for automatically discharging the holders from the cooking space after the slices have been discharged from the holders, said partitions having openings therethrough, said storage magazine comprising a series of vertical compartments having the slices stacked therein, said storage magazine having means for imparting step-by-step movement thereto for successively disposing the said compartments in communication with one of the openings through one of the partitions, said one opening having a chute extending therefrom to the cooking space.

5. A machine for preparing sandwiches from sliced food of different characteristics, comprising a case; partitions dividing the case into a storage magazine for sliced food of one character, a storage chamber for sliced food of another character, and a cooking space, mechanism for periodically feeding at least one slice from the storage magazine to the cooking space; a holder for each of the slices of food in the storage chamber; mechanism for periodically feeding a holder and its contained slice from the storage chamber; parts for directing the said slices and holder into the cooking space; apparatus for automatically discharging the cooked slices from the holder and the cooking space after the same have remained in the latter for a certain period of time; and means for automatically discharging the holders from the cooking space after the slices have been discharged from the holders, said partitions having openings therethrough, said storage chamber having a plurality of drawers therein removable from the case and each including a movable rack for the holders, said rack having means for imparting step-by-step movement thereto whereby to successively discharge a holder therefrom through an opening in the underlying partition, said opening having a chute extending therefrom to the cooking space.

6. A machine for preparing sandwiches from sliced food of different characteristics, comprising a case; partitions dividing the case into a storage magazine for sliced food of one character, a storage chamber for sliced food of another character, and a cooking space, mechanism for periodically feeding at least one slice from the storage magazine to the cooking space; a holder for each of the slices of food in the storage chamber; mechanism for periodically feeding a holder and its contained slice from the storage chamber; parts for directing the said slices and holder into the cooking space; apparatus for automatically discharging the cooked slices from the holder and the cooking space after the same have remained in the latter for a certain period of time; and means for automatically discharging the holders from the cooking space after the slices have been discharged from the holders, said partitions having openings therethrough, said storage magazine comprising a series of vertical compartments having the slices stacked therein, said storage magazine having means for imparting step-by-step movement thereto for successively disposing the said compartments in communication with one of the openings through one of the partitions, said one opening having a chute extending therefrom to the cooking space, said cooking space having a ring-shaped, sectional oven rotatably mounted therein, said oven having driving means for imparting step-by-step movement thereto for successively locating the sections beneath the said chute.

7. A machine for preparing sandwiches from sliced food of different characteristics, comprising a case; partitions dividing the case into a storage magazine for sliced food of one character, a storage chamber for sliced food of another character, and a cooking space, mechanism for periodically feeding at least one slice from the storage magazine to the cooking space; a holder for each of the slices of food in the storage chamber; mechanism for periodically feeding a holder and its contained slice from the storage chamber; parts for directing the said slices and holder into the cooking space; apparatus for automatically discharging the cooked slices from the holder and the cooking space after the same have remained in the latter for a certain period of time; and means for automatically discharging the holders from the cooking space after the slices have been discharged from the holders, said partitions having openings therethrough, said storage chamber having a plurality of drawers therein removable from the case and each including a movable rack for the holders, said rack having means for imparting step-by-step movement thereto whereby to successively discharge a holder therefrom through an opening in the underlying partition, said opening having a chute extending therefrom to the cooking space, said cooking space having a ring-shaped sectional oven rotatably mounted therein, said oven having driving means for imparting step-by-step movement thereto for successively locating the sections beneath the said chute.

8. A machine for preparing sandwiches from sliced food of different characteristics, comprising a case divided into a storage magazine for sliced food of one character, a storage chamber for sliced food of another character, a cooking space and a collecting space; chutes interconnecting said storage magazine and the cooking space; chutes interconnecting the storage chamber and the cooking space; chutes extending from the cooking space to the collecting space; means for causing the food slices to pass through the chutes at predetermined intervals to cook and assemble the same into sandwich form; actuating mechanism for each of said means respectively; and a timing and controlling device common to all of the actuating mechanisms adapted to cause the same to operate in sequence to advance the food slices to the cooking space from the storage magazine and from the storage chamber respectively, and from the cooking space to the collecting space.

9. A machine for preparing sandwiches from sliced food of different characteristics, comprising a case divided into a storage magazine for sliced food of one character, a storage chamber for sliced food of another character, a cooking space and a collecting space; chutes interconnecting said storage magazine and the cooking space; chutes interconnecting the storage chamber and the cooking space; chutes extending from the cooking space to the collecting space; means for causing the food slices to pass through the chutes at predetermined intervals to cook and assemble the same into sandwich form; actuating mechanism for each of said means respectively; a timing and controlling device common to all of the actuating mechanisms adapted to cause the same to operate in sequence to advance the food slices to the cooking space from the storage magazine and from the storage chamber respectively, and from the cooking space to the collecting space; and apparatus for disposing each sandwich in a receptacle immediately prior to its entrance into the collecting space, said apparatus having connection with the timing and controlling device whereby the same is operated in timed relation with the said actuating mechanism.

10. A machine for preparing sandwiches from sliced food of different characteristics, comprising a case divided into a storage magazine for sliced food of one character, a storage chamber for sliced food of another character, a cooking space and a collecting space; chutes interconnecting said storage magazine and the cooking space; chutes interconnecting the storage chamber and the cooking space; chutes extending from the cooking space to the collecting space; means for causing the food slices to pass through the chutes at predetermined intervals to cook and assemble the same into sandwich form; actuating mechanism for each of said means respectively; a timing and controlling device common to all of the actuating mechanisms adapted to cause the same to operate in sequence to advance the food slices to the cooking space from the storage magazine and from the storage chamber respectively, and from the cooking space to the collecting space; and apparatus for disposing each sandwich in a receptacle immediately prior to its entrance into the collecting space, said apparatus having connection with the timing and controlling device whereby the same is operated in timed relation with the said actuating mechanism, said timing and controlling device being adapted to continuously operate to cause food slices to be periodically fed to the cooking space and to the receptacles from the cooking space, to the collecting space, said collecting space having a plurality of floors therein and means associated with the floors for causing the loaded receptacles to pass to an empty floor after one of the floors has been completely filled with loaded receptacles.

11. A machine for preparing sandwiches from sliced food of different characteristics, comprising a case divided into a storage magazine for sliced food of one character, a storage chamber for sliced food of another character, a cooking space and a collecting space; chutes interconnecting said storage magazine and the cooking space; chutes interconnecting said storage chamber and the cooking space; chutes extending from the cooking space to the collecting space; means for causing the food slices to pass through the chutes at predetermined intervals to cook and assemble the same into sandwich form; actuating mechanism for each of said means respectively; a timing and controlling device common to all of the actuating mechanisms adapted to cause the same to operate in sequence to advance the food slices to the cooking space from the storage magazine and from the storage chamber respectively, and from the cooking space to the collecting space; and apparatus for disposing each sandwich in a receptacle immediately prior to its entrance into the collecting space, said apparatus having connection with the timing and controlling device whereby the same is operated in timed relation with the said actuating mechanism, said timing and controlling device being adapted to continuously operate to cause food slices to be periodically fed to the cooking space and to the receptacles from the cooking space, to the collecting space, said collecting space having a feed belt therein positioned to receive loaded receptacles, said feed belt being extended to a point outside the case.

12. A machine for preparing sandwiches from sliced food of different characteristics, comprising a case divided into a storage magazine for sliced food of one character, a storage chamber for sliced food of another character, a cooking space and a collecting space; chutes interconnecting said storage magazine and the cooking space; chutes interconnecting the storage chamber and the cooking space; chutes extending from the cooking space to the collecting space; means for causing the food slices to pass through the chutes at predetermined intervals to cook and assemble the same into sandwich form; actuating mechanism for each of said means respectively; a timing and controlling device common to all of the actuating mechanisms adapted to cause the same to operate in sequence to advance the food slices to the cooking space from the storage magazine and from the storage chamber respectively, and from the cooking space to the collecting space; and apparatus for disposing each sandwich in a receptacle immediately prior to its entrance into the collecting space, said apparatus having connection with the timing and controlling device whereby the same is operated in timed relation with the said actuating mechanism, said timing and controlling device being adapted to continuously operate to cause food slices to be periodically fed to the cooking space and to the receptacles from the cooking space, to the collecting space, said collecting space having a feed belt therein positioned to receive the receptacles after the same have received a sandwich from the cooking space, said feed belt being extended to a point outside the case, said feed belt having a motor for driving the same, and means controllable by the removal of one of the filled receptacles from the belt to start the motor.

13. A machine for preparing sandwiches from sliced food of different characteristics, comprising a case divided into a storage magazine for sliced food of one character, a storage chamber for sliced food of another character, a cooking space and a collecting space; chutes interconnecting said storage magazine and the cooking space; chutes interconnecting the storage chamber and the cooking space; chutes extending from the cooking space to the collecting space; means for causing the food slices to pass through the chutes at predetermined intervals to cook and assemble the same into sandwich form; actuating mechanism for each of said means respectively; and a timing and controlling device common to all of the actuating mechanisms adapted to cause the same to operate in sequence to advance the food slices to the cooking space from the storage magazine and from the storage chamber respectively, and from the cooking space to the collecting space, said cooking space having a ring-shaped oven therein including a plurality of hollow sections each adapted to receive sliced food of one character and sliced food of another character from the said storage magazine and from the said storage chamber respectively, said oven having means for imparting step-by-step movement thereto.

14. A machine for preparing sandwiches from sliced food of different characteristics, comprising a case divided into a storage magazine for sliced food of one character, a storage chamber for sliced food of another character, a cooking space and a collecting space; chutes interconnecting said storage magazine and the cooking space; chutes interconnecting the storage chamber and the cooking space; chutes extending from the cooking space to the collecting space; means for causing the food slices to pass through the chutes at predetermined intervals to cook and assemble the same into sandwich form; actuating mechanism for each of said means respectively; and a timing and controlling device common to all of the actuating mechanisms adapted to cause the same to operate in sequence to advance the food slices to the cooking space from the storage magazine and from the storage chamber respectively, and from the cooking space to the collecting space, said cooking space having a ring-shaped oven therein including a plurality of hollow sections each adapted to receive sliced food of one character and sliced food of another character from the said storage magazine and from the said storage chamber respectively, said oven having means for imparting step-by-step movement thereto, said sliced food forming a sandwich and from the storage magazine and from the storage chamber being fed into one of the hollow sections at different times and removed therefrom at the same time, whereby one slice is cooked longer than the others.

15. A machine for preparing sandwiches from sliced food of different characteristics, comprising a case divided into a storage magazine for sliced food of one character, a storage chamber for sliced food of another character, a cooking space and a collecting space; chutes interconnecting said storage magazine and the cooking space; chutes interconnecting the storage chamber and the cooking space; chutes extending from the cooking space to the collecting space; means for causing the food slices to pass through the chutes at predetermined intervals to cook and assemble the same into sandwich form; actuating mechanism for each of said means respectively; and a timing and controlling device common to all of the actuating mechanisms adapted to cause the same to operate in sequence to advance the food slices to the cooking space from the storage magazine and from the storage chamber respectively, and from the cooking space to the collecting space, the slice of food from the storage magazine being confined within a holder as it is moved from said magazine to the cooking space, said holder being separated therefrom while the said slice of food is in the oven and after the slice has been cooked.

16. A machine for preparing sandwiches from sliced food of different characteristics, comprising a case divided into a storage magazine for sliced food of one character, a storage chamber for sliced food of another character, a cooking space and a collecting space; chutes interconnecting said storage magazine and the cooking space; chutes interconnecting the storage chamber and the cooking space; chutes extending from the cooking space to the collecting space; means for causing the food slices to pass through the chutes at predetermined intervals to cook and assemble the same into sandwich form; actuating mechanism for each of said means respectively; and a timing and controlling device common to all of the actuating mechanisms adapted to cause the same to operate in sequence to advance the food slices to the cooking space from the storage magazine and from the storage chamber respectively, and from the cooking space to the collecting space, the slice of food from the storage magazine being confined within a holder as it is moved from said magazine to the cooking space, said holder being separated therefrom while the said slice of food is in the oven and after the slice has been cooked, said holder being automatically released from within the oven under the influence of said timing and controlling means after the said slice of food has been separated therefrom.

17. A machine for preparing sandwiches from sliced food of different characteristics, comprising a case divided into a storage magazine for sliced food of one character, a storage chamber for sliced food of another character, a cooking space and a collecting space; chutes interconnecting said storage magazine and the cooking space; chutes interconnecting the storage chamber and the cooking space; chutes extending from the cooking space to the collecting space; means for causing the food slices to pass through the chutes at predetermined intervals to cook and assemble the same into sandwich form; actuating mechanism for each of said means respectively; and a timing and controlling device common to all of the actuating mechanisms adapted to cause the same to operate in sequence to advance the food slices to the cooking space from the storage magazine and from the storage chamber respectively, and from the cooking space to the collecting space, the slice of food from the storage magazine being confined within a holder as it is moved from said magazine to the cooking space, said holder being separated therefrom while the said slice of food is in the oven and after the slice has been cooked, said holder being automatically released from within the oven under the influence of said timing and controlling means after the said slice of food has been separated therefrom, said case having a discharge flap movably mounted therein to eject the said holder as it is released from the oven.

18. A machine for preparing sandwiches from sliced food of different characteristics, comprising a case divided into a storage magazine for sliced food of one character, a storage chamber for sliced food of another character, a cooking space and a collecting space; chutes interconnecting said storage magazine and the cooking space; chutes interconnecting the storage chamber and the cooking space; chutes extending from the cooking space to the collecting space; means for causing the food slices to pass through the chutes at predetermined intervals to cook and assemble the same into sandwich form; actuating mechanism for each of said means respectively; and a timing and controlling device common to all of the actuating mechanisms adapted to cause the same to operate in sequence to advance the food slices to the cooking space from the storage magazine and from the storage chamber respectively, and from the cooking space to the collecting space, the slice of food from the storage magazine being confined within a holder as it is moved from said magazine to the cooking space, said holder being separated therefrom while the said slice of food is in the oven and after the slice has been cooked, said holder being automatically released from within the oven under the influence of said timing and controlling means after the said slice of food has been separated therefrom, said case having a discharge flap movably mounted therein to eject the said holder as it is released from the oven, said flap having a latch for holding the same in the operative position to eject the holder, said latch being movable to the released position by the timing and controlling means after the holder has been ejected.

19. In a machine for preparing sandwiches from sliced food of different characteristics; a ring-shaped oven having a plurality of hollow sections; means for rotating the oven about its axis; stationary means for feeding a slice of food of one character into each section as each section passes said means; means for feeding slices of food of another character into each section after the sections have received slices of food of one charatcer and have moved through part of a revolution with the oven; and means for removing all slices of food from each section after the respective sections have returned to the point where a slice of food of one character was fed thereto.

SAMUEL F. LLOYD.